June 13, 1939.  O. H. ARLT  2,162,291

SPRINGING ARRANGEMENT FOR VEHICLES

Filed March 17, 1937  2 Sheets-Sheet 1

Inventor:
Oskar Hermann Arlt.

June 13, 1939.  O. H. ARLT  2,162,291

SPRINGING ARRANGEMENT FOR VEHICLES

Filed March 17, 1937  2 Sheets-Sheet 2

Inventor:

Patented June 13, 1939

2,162,291

UNITED STATES PATENT OFFICE 2,162,291

SPRINGING ARRANGEMENT FOR VEHICLES

Oskar Hermann Arlt, Zwickau, Germany, assignor to Auto Union Aktiengesellschaft, Chemnitz, Germany Application March 17, 1937, Serial No. 131,476
In Germany March 26, 1936

6 Claims. (Cl. 267—21)

This invention relates to a springing arrangement, more particularly for automobiles with independent wheels using rubber members stressed in shear and arranged in the pivot joint of the link member.

Springing arrangements of this kind are known in which the rubber members are constructed as sleeves and extend substantially only on one side of the plane of swinging of the link member. These rubber sleeves are effective in all the planes in which the bearing forces act, which has the drawback that, in the best case, the springing can only be suitably chosen for one of the planes in which the bearing forces act. In this case the rubber material is utilised only to a small extent. The one-sided application of the bearing forces to the rubber sleeves produces only alternating stresses, which cause fatigue of the rubber material. Such springing arrangements are neither sufficiently effective nor sufficiently reliable.

In contradistinction thereto the invention consists in this, that the rubber members are constructed as strips parallel to the pivotal axis of the link and extend symmetrically to the plane of swinging of the link on both sides. These rubber strips may serve both as springing and as supporting members. The springing can thereby be made comparatively hard in the vertical plane of action of the bearing forces owing to the shear stresses, but comparatively soft in the horizontal plane of action of the bearing forces owing to the compression or tension stresses. The long narrow rubber strips require a small volume of material and are easily prepared and installed. Preferably the rubber strips are arranged in the vertical plane of action of the bearing forces, being secured at one end to the forked end of the link and at the other end to a bearing bracket extending into the link. The rubber strips in this case form the direct securing means between the link and the frame. Such a springing arrangement is very effective and reliable.

The arrangement according to the invention is illustrated in several constructional examples in the drawings.

Figure 1:
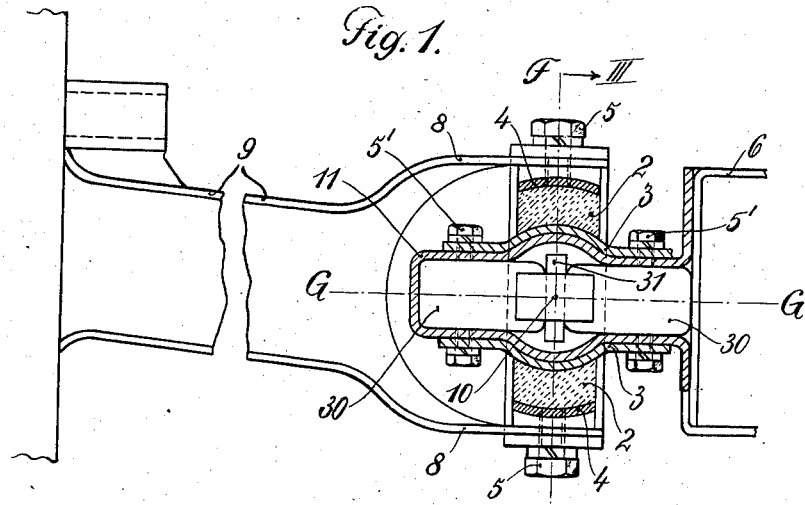
Fig. 1 is a vertical principal section through a swinging half axle.
Figure 2:
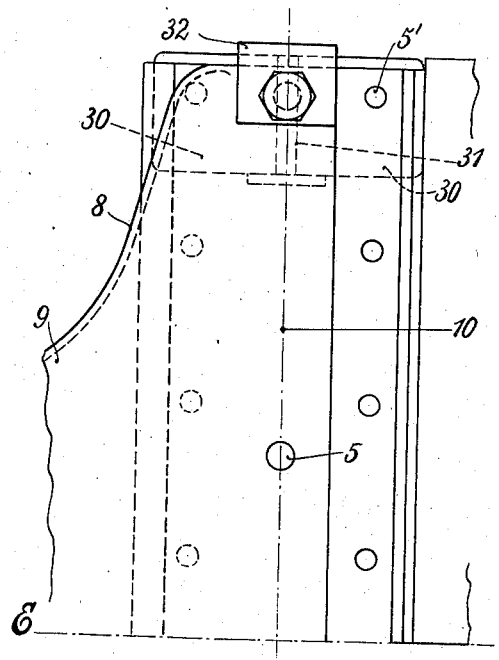
Fig. 2 is a corresponding plan view.
Figure 3:
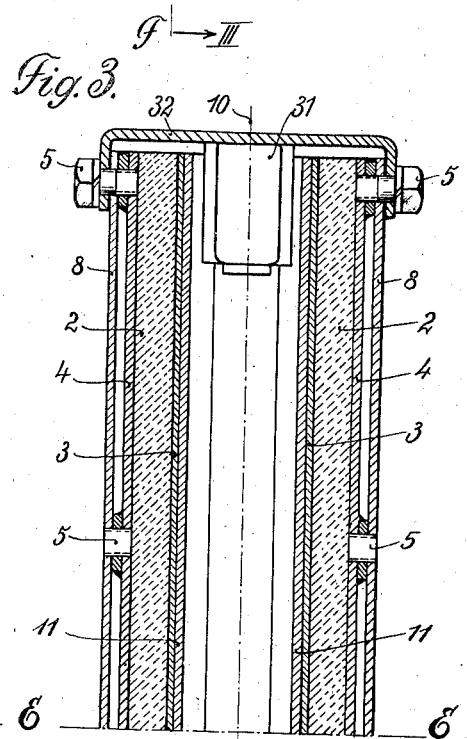
Fig. 3 is a section along the line III—III in Fig. 1.

In the constructional example according to Figs. 1 to 3, the swinging half axle 9 is mounted on the box-form longitudinal central frame member 6 by means of two rubber members, which are constructed as rubber strips 2 parallel to the pivotal axis 10 of the half axle 9. The rubber strips 2 extend on both sides of the plane of swinging E of the half axle 9 in the vertical plane of action F of the bearing forces. The rubber strips 2 are secured to the forked ends 8 of the half axle 9 by means of adhering plates 4 and by means of adhering plates 3 to a bearing bracket 11, which is arranged between the forked ends 8 of the half axle 9. The plates 3 of the rubber strips 2 are connected with the bearing bracket 11 by means of screw bolts 5' and the plates 4 are connected with the forked ends 8 of the half axle 9 by means of screw bolts 5. The plates 3, 4 are curved to a cylinder about the axis 10. The forked ends 8 of the half axle 9 are secured on both sides of the plane of swinging E by means of stirrups 32. The stirrups 32 are provided with extensions 31 which project into the pivotal axis 10 in the bearing bracket 11. The extensions 31 of the stirrups 32 engage between two rubber members 30 which are locked in the ends of the bracket 11. The rubber strips 2 have to take up a springing moment (vertical bearing force multiplied by link length) which stresses them in shear. Also the rubber strips 2 have to take up the bearing force, so that the upper is stressed in tension and the lower in compression. The yielding of the half axle 9 under this bearing force is only small with the given hardness of the rubber strips 2, while the damping is very great. Finally, the rubber strips have to take up a springing moment (horizontal bearing force multiplied by link length), which tends to stress them in torsion. This moment is also taken up by the rubber members 30, which can be initially stressed in a suitable manner and restrict the yielding of the half axle 9 in the horizontal plane G. The rubber members 30 can only have a small reaction on the yielding of the half axle 9 in the vertical plane F, so that this is determined solely by the shear stress of the rubber strips 2.

Figure 4:
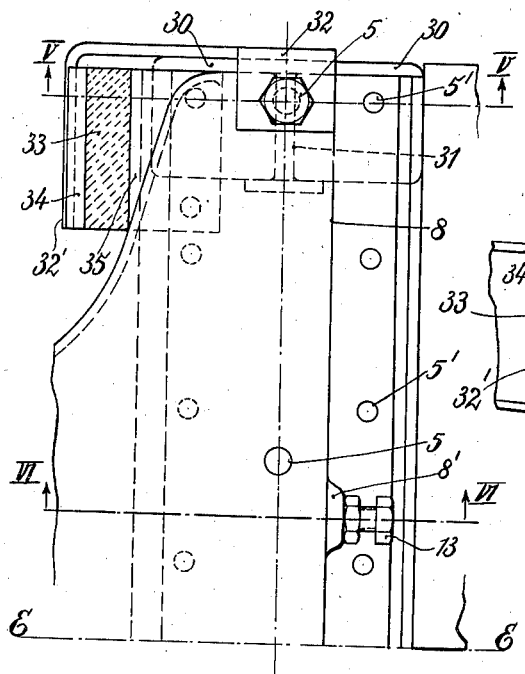
Fig. 4 is a plan view of a second construction of the swinging half axle.
Figure 5:
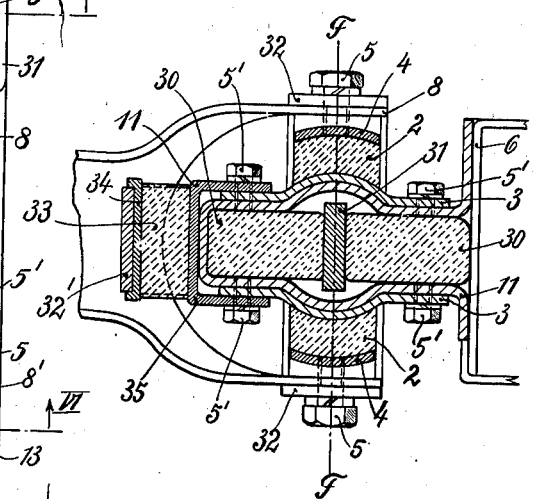
Fig. 5 is a section along the line V—V.
Figure 6:
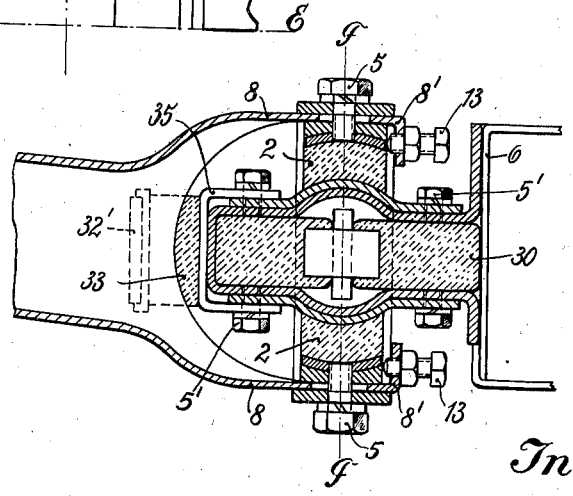
Fig. 6 is a section along the line VI—VI in Fig. 4.

In the constructional example according to Figs. 4 to 6 the stirrups 32 are also provided with arms 32' which embrace the bearing bracket 11 through the intermediary of a further rubber member 33. This rubber member is provided with adhering plates 34, 35, of which the outer is inserted in the stirrup arm 32' and the inner is secured to the bracket 11 by the screw bolts 5'. The rubber members 33 are stressed substantially only in shear by the vertical bearing forces and they assist the yielding of the half axle 9 within certain limits. The rubber members 33 are stressed in tension or compression by the horizontal bearing forces and they assist the action of the initially stressed rubber members 30. For adjusting or re-adjusting the springing arrangement, pressure screws 13 are provided, which are mounted on projections 8' of the forked ends 8. By means of these screws, the adhering plates 4 of the rubber strips 2 can be displaced with respect to the forked ends 8 of the half axle 9. By means of this device it is possible to adjust the inclination of the axle in a simple manner.

The rubber strips 2 are enclosed in the forked ends 8 of the half axle 9 and are thereby protected from the action of the weather and the road. The half axle 9 can be removed from the frame 6, together with the springing arrangement, after releasing the screw bolts 5. This construction is so compact that a vehicle body with a continuous flat floor can be used.

What I claim is:

1. A springing arrangement more particularly for motor vehicles comprising a link member, a wheel guided by said link member, a bearing bracket and shear stressed rubber strips arranged parallel to the axis of rotation of the link member and having bearing surfaces arranged concentrically to said axis, said bearing strips being interposed between said link and said bracket and constituting the rotary bearing for said link member.

2. A springing arrangement more particularly for motor vehicles comprising a link member, a wheel guided by said link member, a bearing bracket and shear stressed rubber strips arranged parallel to the axis of rotation of the link member and having bearing surfaces arranged concentrically to said axis, said bearing strips being interposed between said link and said bracket and constituting the rotary bearing for said link member, said rubber strips being arranged on both sides of the bearing bracket in the vertical plane of action of the bearing forces.

3. A springing arrangement for motor vehicles comprising a wheel, a link member for guiding said wheel and having a forked end, a bearing bracket and shear stressed rubber strips arranged parallel to the axis of rotation of the link member and having bearing surfaces disposed concentrically to said axis, each rubber strip having one of the bearing surfaces thereof secured to one of the limbs of the forked end of the link member and having the other bearing surface secured to the adjacent part of said bracket, the several bearing strips constituting the rotary bearing for the link member.

4. Springing arrangement as claimed in claim 3, characterised by the feature that the forked end of the link member is embraced by stirrups and acted upon in the horizontal plane of action of the bearing forces by additional rubber members stressed, for example, in compression.

5. Springing arrangement as claimed in claim 3 having stirrups connecting the limbs of the forked end of the link member and embracing the rubber strips on both sides of the plane of swinging of the link, with extensions on said stirrups arranged in the axis of rotation, and engaging between two rubber members which are locked in the ends of the bearing bracket.

6. Springing arrangement as claimed in claim 3 characterized in that the points of securement of the rubber strips are adjustable with respect to the forked end of the link, for example, by means of screw bolts.

OSKAR HERMANN ARLT.